(12) United States Patent
Zhou (10) Patent No.: US 11,108,943 B2
(45) Date of Patent: Aug. 31, 2021

(54) IMAGE SENSOR, FOCUSING CONTROL METHOD, AND ELECTRONIC DEVICE

(71) Applicant: Guangdong OPPO Mobile Telecommunications Corp., Ltd., Guangdong (CN)

(72) Inventor: Qiqun Zhou, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/664,327

(22) Filed: Oct. 25, 2019

(65) Prior Publication Data
US 2020/0059593 A1 Feb. 20, 2020

Related U.S. Application Data

(63) Continuation of application No. PCT/CN2018/084022, filed on Apr. 23, 2018.

(30) Foreign Application Priority Data

Apr. 28, 2017 (CN) .......................... 201710297448.8

(51) Int. Cl.
*H04N 5/232* (2006.01)
*G02B 7/36* (2021.01)
(Continued)

(52) U.S. Cl.
CPC ............ *H04N 5/23212* (2013.01); *G02B 7/36* (2013.01); *G03B 13/36* (2013.01); *H04N 5/2258* (2013.01); *H04N 5/247* (2013.01)

(58) Field of Classification Search
CPC .. H04N 5/23212; H04N 5/2258; H04N 5/247; G02B 7/36; G03B 13/36
See application file for complete search history.

(56) References Cited

U.S. PATENT DOCUMENTS 7,745,779 B2 6/2010 Conners
2009/0278966 A1 11/2009 Kusaka
(Continued)

FOREIGN PATENT DOCUMENTS

CN 1501507 A 6/2004
CN 102625034 A 8/2012
(Continued)

OTHER PUBLICATIONS

European search report, European Application No. EP18790001.4, dated Sep. 12, 2019 (8 pages).
(Continued)

*Primary Examiner* — Ahmed A Berhan
(74) *Attorney, Agent, or Firm* — Young Basile Hanlon & MacFarlane, P.C.

(57) ABSTRACT

An image sensor, a focusing control method, and an electronic device are disclosed. The image sensor includes: a photosensitive unit array, a filter unit array disposed above the photosensitive unit array, and a micro-lens array located above the filter unit array. The photosensitive cell array includes one or more focusing photosensitive cells and multiple non-focusing photosensitive cells. Each of the focusing photosensitive cells includes multiple photosensitive pixels. The micro-lens array includes one or more first micro-lenses and multiple second micro-lenses; wherein each of the focusing photosensitive cells is covered by a corresponding one of the first micro-lenses, and each of the non-focusing photosensitive cells is covered by N*N of the second micro-lenses; wherein N is a positive integer.

18 Claims, 6 Drawing Sheets

(51) Int. Cl.
  *G03B 13/36* (2021.01)
  *H04N 5/225* (2006.01)
  *H04N 5/247* (2006.01)

(56) References Cited

U.S. PATENT DOCUMENTS

| | | |
|---|---|---|
| 2012/0033120 A1 | 2/2012 | Nakamura et al. |
| 2013/0222553 A1 | 8/2013 | Tsuchita |
| 2016/0205311 A1* | 7/2016 | Mandelli ............... G02B 5/201 348/349 |
| 2017/0094210 A1* | 3/2017 | Galor Gluskin .. H01L 27/14627 |

FOREIGN PATENT DOCUMENTS

| | | |
|---|---|---|
| CN | 104064577 A | 9/2014 |
| CN | 105609516 A | 5/2016 |
| CN | 105611122 A | 5/2016 |
| CN | 105611124 A | 5/2016 |
| CN | 106549025 A | 3/2017 |
| CN | 107135340 A | 9/2017 |
| EP | 1936955 A2 | 6/2008 |
| EP | 2753073 A1 | 7/2014 |
| WO | 2017052893 A1 | 3/2017 |

OTHER PUBLICATIONS

International search report, PCT/CN2018/084022, dated Nov. 7, 2018 (2 pages).
OA with English translation for a counterpart Chinese patent Application 201710297448.8, dated Jan. 3, 2019 (10 pages).
3GPP TS 23.502 V2.0.0 at pp. 119-144, Subclause 4.11 System interworking procedures (Dec. 2017).
3GPP TS 23.502 V2.0.0 at p. 165, Subclause 4.13.4.2 Emergency services fallback (Dec. 2017).
European second examination report for EP Application 18790001.4 dated Mar. 2, 2021. (4 pages).
Indian First Examination Report for IN Application 201917046678 dated Jan. 29, 2021. (6 pages).

* cited by examiner

Focusing mode

IMAGE SENSOR, FOCUSING CONTROL METHOD, AND ELECTRONIC DEVICE

CROSS-REFERENCE TO RELATED APPLICATION(S)

This application is a continuation application of International (PCT) Patent Application No. PCT/CN2018/084022, filed on Apr. 23, 2018, which claims priority to Chinese Patent Application No. 201710297448.8, filed on Apr. 28, 2017, the contents of both of which are herein incorporated by reference in their entireties.

TECHNICAL FIELD

The present disclosure relates to the field of electronic technologies, and in particular to an image sensor, a focusing control method, and an electronic device.

BACKGROUND

With continuous update of technology, more and more manufacturers are beginning to use image sensors with 16M-4M structure. Under dark conditions, the image sensors output images in a 4M mode, which can improve a signal-to-noise ratio and improve noise performance. Under the condition that ambient light is better, the image sensors output images in a 16M mode, and an image with higher definition may be acquired by using interpolation restoration algorithm.

SUMMARY

In one aspect, the present disclosure provides a focusing control method for an image sensor. The image sensor may include: a photosensitive cell array; a filtering cell array, disposed above the photosensitive cell array; and a micro-lens array, located above the filtering cell array, and including one or more first micro-lenses and a plurality of second micro-lenses. The photosensitive cell array may include one or more focusing photosensitive cells and a plurality of non-focusing photosensitive cells. Each of the focusing photosensitive cells may include a plurality of photosensitive pixels. Each of the focusing photosensitive cells is covered by a corresponding one of the first micro-lenses, and each of the non-focusing photosensitive cells is covered by N*N of the second micro-lenses; wherein N is a positive integer. The focusing control method may include: controlling the photosensitive cell array to enter a focusing mode; reading output values of a part of the photosensitive pixels in each of the focusing photosensitive cells as first output values; reading output values of the remaining part of the photosensitive pixels in each of the focusing photosensitive cells as second output values; and performing focusing control according to the first output values and the second output values.

In another aspect, the present disclosure provides an image sensor. The image sensor may include: a photosensitive cell array; a filtering cell array, disposed above the photosensitive cell array; and a micro-lens array, located above the filtering cell array, and including one or more first micro-lenses and a plurality of second micro-lenses. The photosensitive cell array may include one or more focusing photosensitive cells and a plurality of non-focusing photosensitive cells. Each of the focusing photosensitive cells may include a plurality of photosensitive pixels. Each of the focusing photosensitive cells is covered by a corresponding one of the first micro-lenses, and each of the non-focusing photosensitive cells is covered by N*N of the second micro-lenses; wherein N is a positive integer. The image sensor may further include a controller. The controller is coupled to the photosensitive cell array. The controller is configured to control the photosensitive cell array to enter a focusing mode; read output values of a part of the photosensitive pixels in each of the focusing photosensitive cells as first output values; read output values of the remaining part of the photosensitive pixels in each of the focusing photosensitive cells as second output values; and perform focusing control according to the first output values and the second output values.

In a further aspect, the present disclosure provides an electronic device. The electronic device may include: a housing, and an image sensor, a non-transitory memory, and a processor which are received in the housing. The image sensor may include: a photosensitive cell array; a filtering cell array, disposed above the photosensitive cell array; and a micro-lens array, located above the filtering cell array, and including one or more first micro-lenses and a plurality of second micro-lenses. The photosensitive cell array may include one or more focusing photosensitive cells and a plurality of non-focusing photosensitive cells. Each of the focusing photosensitive cells may include a plurality of photosensitive pixels. Each of the focusing photosensitive cells is covered by a corresponding one of the first micro-lenses, and each of the non-focusing photosensitive cells is covered by N*N of the second micro-lenses; wherein N is a positive integer. The non-transitory may be configured to store an executable program code. The processor may be configured to read the executable program code stored in the memory and run a program corresponding to the executable program code to: control the photosensitive cell array to enter a focusing mode; read output values of a part of the plurality of photosensitive pixels in each of the focusing photosensitive cells as first output values; read output values of the remaining part of the plurality of photosensitive pixels in each of the focusing photosensitive cells as second output values; and perform focusing control according to the first output values and the second output values.

Additional aspects and advantages of the present disclosure will be set forth in part in the following description. The part may become apparent from the description in the following, or be learnt about from the practice of the present disclosure.

BRIEF DESCRIPTION OF DRAWINGS

In order to more clearly describe technical solutions in embodiments of the present disclosure, the drawings used in some embodiments will be briefly described below. Apparently, the drawings described in the following are some embodiments of the present disclosure, and those skilled in the art may also acquire other drawings based on these drawings without creative efforts.

DETAILED DESCRIPTION

The embodiments of the present disclosure will be described in detail below. Examples of the embodiments may be illustrated in the drawings. Same or similar reference numerals may be used to indicate same or similar elements or elements having same or similar functions. The embodiments described below with reference to the drawings are illustrative, and are not intended to be construed as limiting.

An image sensor, a focusing control method, an imaging device, and an electronic device according to some embodiments of the present disclosure may be described below with reference to the accompanying drawings.

In one aspect, the present disclosure provides a focusing control method for an image sensor. The image sensor may include: a photosensitive cell array; a filtering cell array, disposed above the photosensitive cell array; and a micro-lens array, located above the filtering cell array, and including one or more first micro-lenses and a plurality of second micro-lenses. The photosensitive cell array may include one or more focusing photosensitive cells and a plurality of non-focusing photosensitive cells. Each of the focusing photosensitive cells may include a plurality of photosensitive pixels. Each of the focusing photosensitive cells is covered by a corresponding one of the first micro-lenses, and each of the non-focusing photosensitive cells is covered by N*N of the second micro-lenses; wherein N is a positive integer. The focusing control method may include: controlling the photosensitive cell array to enter a focusing mode; reading output values of a part of the photosensitive pixels in each of the focusing photosensitive cells as first output values; reading output values of the remaining part of the photosensitive pixels in each of the focusing photosensitive cells as second output values; and performing focusing control according to the first output values and the second output values.

In some embodiments, the performing focusing control according to the first output values and the second output values may include: generating, according to the first output values, a first phase value; wherein the first phase value is a sum of the first output values; generating, according to the second output values, a second phase value; wherein the second phase value is a sum of the second output values; and performing the focusing control according to the first phase value and the second phase value.

In some embodiments, the image sensor is used in an electronic device, and the electronic device includes a lens. The performing the focusing control according to the first phase value and the second phase value may include: acquiring phase difference information by using the first phase value and the second phase value; converting the phase difference information into focus distance information; and adjusting, according to the focus distance information, a position of the lens.

In some embodiments, the micro-lens array has a horizontal centerline and a vertical centerline. The number of the first micro-lenses is two or more, and the two or more first micro-lenses may include: a first group of first micro-lenses, disposed along the horizontal centerline; and a second group of first micro-lenses, disposed along the vertical centerline.

In some embodiments, the micro-lens array has four edges, and the two or more first micro-lenses may further include a third group of first micro-lenses disposed on the four edges.

In some embodiments, the first group of first micro-lenses are arranged in a first density; the second group of first micro-lenses are arranged in a second density, and the third group of first micro-lenses are arranged in a third density; the first density and the second density are greater than the third density.

In some embodiments, each of the focusing photosensitive cells and the non-focusing photosensitive cells may include N*N photosensitive pixels, and the method further may include: controlling the photosensitive cell array to enter an imaging mode; controlling to expose the focusing photosensitive cells and the non-focusing photosensitive cells, and reading output values of the photosensitive pixels of the focusing photosensitive cells and output values of the photosensitive pixels of the non-focusing photosensitive cells; and acquiring a first pixel value of each of the focusing photosensitive cells by adding the output values of the N*N photosensitive pixels in the same focusing photosensitive cell, acquiring a second pixel value of each of the non-focusing photosensitive cells by adding the output values of the N*N photosensitive pixels in the same non-focusing photosensitive cell, and generating a merged image by the first pixel value and the second pixel value.

In another aspect, the present disclosure provides an image sensor. The image sensor may include: a photosensitive cell array; a filtering cell array, disposed above the photosensitive cell array; and a micro-lens array, located above the filtering cell array, and including one or more first micro-lenses and a plurality of second micro-lenses. The photosensitive cell array may include one or more focusing photosensitive cells and a plurality of non-focusing photosensitive cells. Each of the focusing photosensitive cells may include a plurality of photosensitive pixels. Each of the focusing photosensitive cells is covered by a corresponding one of the first micro-lenses, and each of the non-focusing photosensitive cells is covered by N*N of the second micro-lenses; wherein N is a positive integer. The image sensor may further include a controller. The controller is coupled to the photosensitive cell array. The controller is configured to control the photosensitive cell array to enter a focusing mode; read output values of a part of the photosensitive pixels in each of the focusing photosensitive cells as first output values; read output values of the remaining part of the photosensitive pixels in each of the focusing photosensitive cells as second output values; and perform focusing control according to the first output values and the second output values.

In some embodiments, the micro-lens array has a horizontal centerline and a vertical centerline. The number of the first micro-lenses is two or more, and the two or more first micro-lenses may include: a first group of first micro-lenses, disposed along the horizontal centerline; and a second group of first micro-lenses, disposed along the vertical centerline.

In some embodiments, the micro-lens array has four edges, and the two or more first micro-lenses may further include a third group of first micro-lenses disposed on the four edges.

In some embodiments, the first group of first micro-lenses are arranged in a first density; the second group of first micro-lenses are arranged in a second density, and the third group of first micro-lenses are arranged in a third density; the first density and the second density are greater than the third density.

In some embodiments, each of the focusing photosensitive cells and the non-focusing photosensitive cells comprises N*N photosensitive pixels.

In some embodiments, the image sensor is used in an electronic device, and the electronic device includes a lens. The controller may be configured to perform focusing control according to the first output values and the second output values by: generating, according to the first output values, a first phase value; wherein the first phase value is a sum of the first output values; generating, according to the second output values, a second phase value; wherein the second phase value is a sum of the second output values; acquiring phase difference information by using the first phase value and the second phase value; converting the phase difference information into focus distance information; and adjusting, according to the focus distance information, a position of the lens.

In some embodiments, the controller may be further configured to: control the photosensitive cell array to enter an imaging mode; control to expose the focusing photosensitive cells and the non-focusing photosensitive cells, and read output values of the photosensitive pixels of the focusing photosensitive cells and output values of the photosensitive pixels of the non-focusing photosensitive cells; and acquire a first pixel value of each of the focusing photosensitive cells by adding the output values of the N*N photosensitive pixels in the same focusing photosensitive cell, acquire a second pixel value of each of the non-focusing photosensitive cells by adding the output values of the N*N photosensitive pixels in the same non-focusing photosensitive cell, and generating a merged image by the first pixel value and the second pixel value.

In some embodiments, the filtering cell array may include a plurality of filtering cells. Each of the filtering cells is disposed correspondingly to one of the focusing photosensitive cells or one of the non-focusing photosensitive cells.

In a further aspect, the present disclosure provides an electronic device. The electronic device may include: a housing, and an image sensor, a non-transitory memory, and a processor which are received in the housing. The image sensor may include: a photosensitive cell array; a filtering cell array, disposed above the photosensitive cell array; and a micro-lens array, located above the filtering cell array, and including one or more first micro-lenses and a plurality of second micro-lenses. The photosensitive cell array may include one or more focusing photosensitive cells and a plurality of non-focusing photosensitive cells. Each of the focusing photosensitive cells may include a plurality of photosensitive pixels. Each of the focusing photosensitive cells is covered by a corresponding one of the first micro-lenses, and each of the non-focusing photosensitive cells is covered by N*N of the second micro-lenses; wherein N is a positive integer. The non-transitory may be configured to store a executable program code. The processor may be configured to read the executable program code stored in the memory and run a program corresponding to the executable program code to: control the photosensitive cell array to enter a focusing mode; read output values of a part of the plurality of photosensitive pixels in each of the focusing photosensitive cells as first output values; read output values of the remaining part of the plurality of photosensitive pixels in each of the focusing photosensitive cells as second output values; and perform focusing control according to the first output values and the second output values.

In some embodiments, the electronic device may further include a lens. The processor may be configured to perform focusing control according to the first output values and the second output values by: generating, according to the first output values, a first phase value; wherein the first phase value is a sum of the first output values; generating, according to the second output values, a second phase value; wherein the second phase value is a sum of the second output values; acquiring phase difference information by using the first phase value and the second phase value; converting the phase difference information into focus distance information; and adjusting, according to the focus distance information, a position of the lens.

In some embodiments, the micro-lens array has a horizontal centerline, a vertical centerline, and four edges. The number of the first micro-lenses is two or more, and the two or more first micro-lenses comprises: a first group of first micro-lenses, disposed along the horizontal centerline; a second group of first micro-lenses, disposed along the vertical centerline; and a third group of first micro-lenses, disposed on the four edges. The first group of first micro-lenses are arranged in a first density; the second group of first micro-lenses are arranged in a second density, and the third group of first micro-lenses are arranged in a third density; the first density and the second density are greater than the third density.

In some embodiments, the filtering cell array may include a plurality of filtering cells. Each of the filtering cells may be disposed correspondingly to one of the focusing photosensitive cells or one of the non-focusing photosensitive cells.

In some embodiments, the processor may be further configured to: control the photosensitive cell array to enter an imaging mode; control to expose the focusing photosensitive cells and the non-focusing photosensitive cells, and read output values of the photosensitive pixels of the focusing photosensitive cells and output values of the photosensitive pixels of the non-focusing photosensitive cells; and acquire a first pixel value of each of the focusing photosensitive cells by adding the output values of the N*N photosensitive pixels in the same focusing photosensitive cell, acquire a second pixel value of each of the non-focusing photosensitive cells by adding the output values of the N*N photosensitive pixels in the same non-focusing photosensitive cell, and generate a merged image by the first pixel value and the second pixel value.

Figure 1:
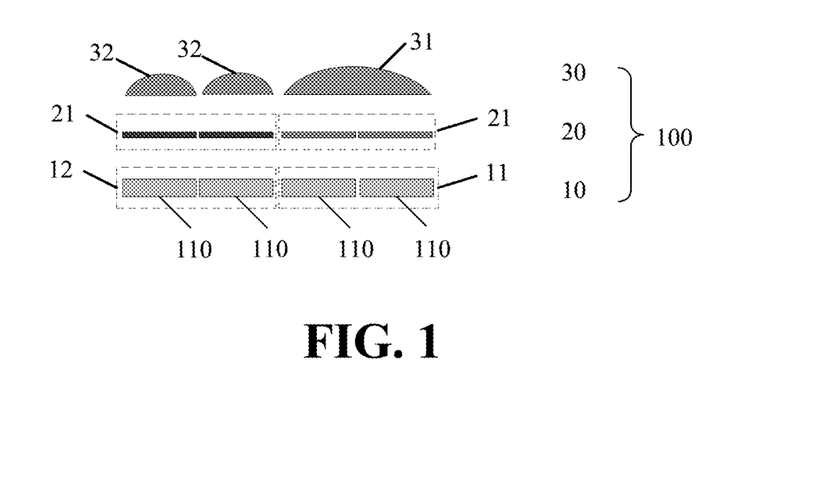
FIG. 1 is a cross-sectional view of an image sensor according to some embodiments of the present disclosure.
Figure 2:
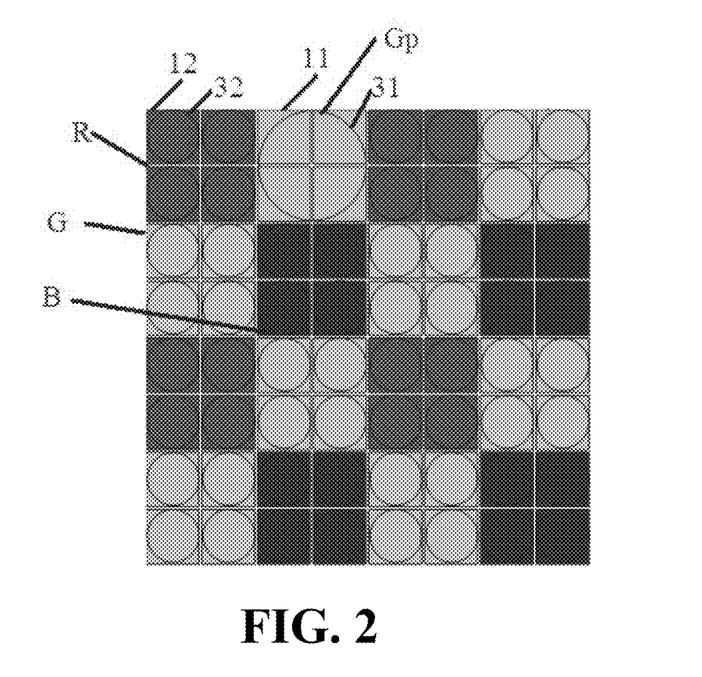
FIG. 2 is a top view of the image sensor with a focusing photosensitive cell and a non-focusing photosensitive cell each having 2*2 photosensitive pixels according to some embodiments of the present disclosure.

FIG. 1 is a cross-sectional view of an image sensor according to some embodiments of the present disclosure. FIG. 2 is a top view of the image sensor with a focusing photosensitive cell and a non-focusing photosensitive cell each having 2*2 photosensitive pixels according to some embodiments of the present disclosure.

As shown in FIGS. 1 and 2, the image sensor 100 may include a photosensitive cell array 10, a filtering cell array 20, and a micro-lens array 30.

The filtering cell array 20 may be disposed above the photosensitive cell array 10, and the micro-lens array 30 may be located above the filtering cell array 20. The photosensitive cell array 10 may include a plurality of focusing photosensitive cells 11 and a plurality of non-focusing photosensitive cells 12. In some embodiments, the number of the focusing photosensitive cells 11 may also be one. That is to say, the photosensitive cell array 10 may include one or more focusing photosensitive cells 11.

Each of the focusing photosensitive cells 11 and the non-focusing photosensitive cells 12 may be a photosensitive cell, and may include N*N photosensitive pixels 110. The filtering cell array 20 may include a plurality of filtering cells 21. Each filtering cell 21 corresponds to one color. The micro-lens array 30 may include one or more first micro-lenses 31 and a plurality of second micro-lenses 32. Each first micro-lens 31 may cover one filtering cell 21 and one focusing photosensitive cell 11. N*N of the second micro-lenses 32 may cover one filtering cell 21 and one non-focusing photosensitive cell 12. Each of the focusing photosensitive cells 11 and the non-focusing photosensitive cells 12 may include N*N photosensitive pixels 110. That is, each first micro-lens 31 may be disposed correspondingly to and cover N*N photosensitive pixels 110 in the corresponding focusing photosensitive cell 11. Each second micro-lens 32 may be disposed correspondingly to and cover one photosensitive pixel 110 in the corresponding non-focusing photosensitive cell 12. As shown in FIG. 2, each of the focusing photosensitive cells 11 and the non-focusing photosensitive cells 12 may include 2*2 photosensitive pixels 110.

Figure 3:
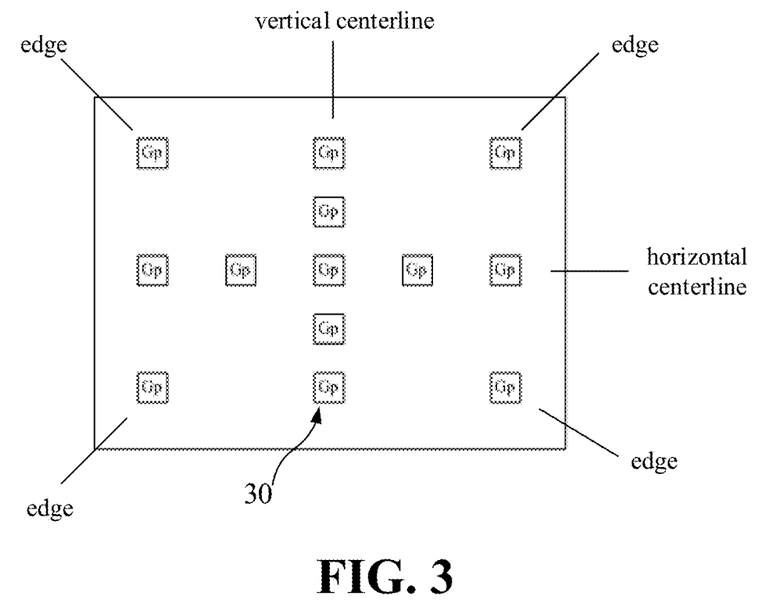
FIG. 3 is a schematic view illustrating a distribution of the focusing photosensitive cell in the image sensor according to some embodiments of the present disclosure.

In some embodiments of the present disclosure, as shown in FIGS. 2 and 3, the focusing photosensitive cells 11 covered by the first micro-lenses 31 may be referred as Gp in the figures, and one focusing photosensitive cell 11 may be disposed correspondingly to one first micro-lens 31. As shown in FIG. 3, the micro-lens array 30 may have a horizontal centerline, a vertical centerline, and four edges. The micro-lens array 30 may have a plurality of first micro-lenses 31. The plurality of first micro-lenses 31 may include a first group of first micro-lenses 31 disposed along the horizontal centerline, a second group of first micro-lenses 31 disposed along the vertical centerline, and a third group of first micro-lens 31 disposed on four edges of the micro-lens array 30.

As may be seen from FIG. 3, the focusing photosensitive cells 11 covered by the first micro-lenses 31, that is, Gp in the figure, may be scatteredly distributed in the whole image sensor, the photosensitive pixels 110 in the focusing photosensitive cells 11 may be approximately 3% to approximately 5% of the total number of pixels of the whole image sensor. The Gp may be more densely distributed in a center region of the image sensor, and more sparsely distributed in an edge region. That is to say, the number of Gp arranged in the center region may be greater than the number of Gp arranged in the edge region. Thus, phase information of a center of a picture may be preferentially acquired, and a focusing speed may be effectively improved without affecting an image quality.

The larger the density of a lens, the larger the refractive index of the lens, and the stronger the focusing ability. Therefore, in order to make the focusing photosensitive cell Gp in the center region gather more light to enhance the focusing speed and shooting effect, in some embodiments of the present disclosure, the first group of first micro-lenses 31 are arranged in a density greater than a density in which the third group of first micro-lenses 31 are arranged, and the second group of first micro-lenses 31 are arranged in a density greater than the density in which the third group of first micro-lenses 31 are arranged. In this way, the mount of light entering the focusing photosensitive cells Gp in the central region may be greater than the mount of light entering the focusing photosensitive cell in the edges, which may improve the focusing speed and the shooting effect.

In some embodiments of the present disclosure, the filtering cell array 20 may have a Bayer configuration. Each of the filtering cells 21 may correspond to N*N photosensitive pixels 110 in the same focusing photosensitive cell 11 or the same non-focusing photosensitive cell 12. That is, N*N photosensitive pixels 110 may correspond to the filtering cell 21 of the same color.

In summary, in the image sensor 100 of some embodiments of the present disclosure, N*N photosensitive pixels 110 may be configured as a group and share one first micro-lens 31. The photosensitive pixels 110 in the focusing photosensitive cell may correspond to the filtering cell 21 of the same color.

In the image sensor 100 according to some embodiments of the present disclosure, the image sensor 100 may have a structure in which one first micro-lens 31 covers one focusing photosensitive cell 11, and N*N second micro-lenses 32 cover one non-focusing photosensitive cell 12. In this way, it is possible to provide a hardware foundation to improve the quality of the picture and increase the focusing speed.

Figure 4:
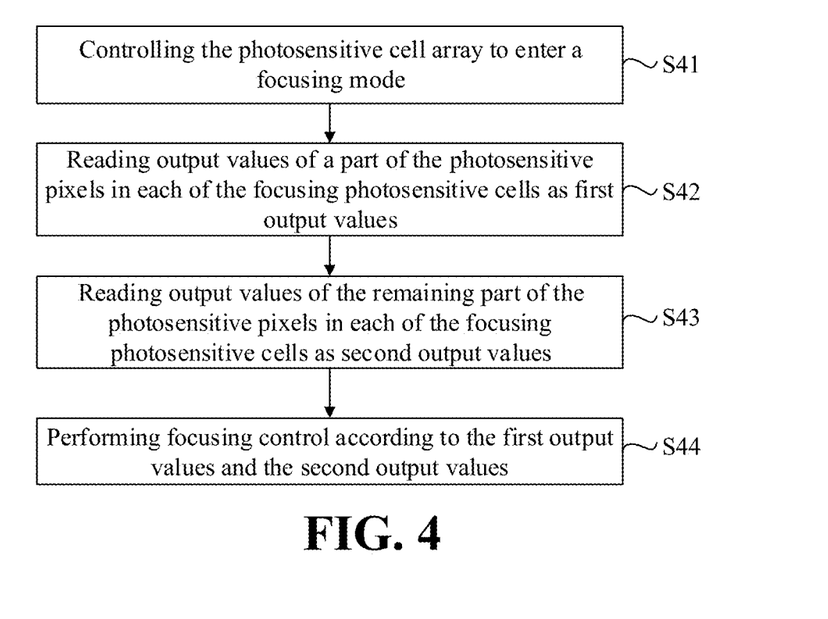
FIG. 4 is a flowchart illustrating a focusing control method for the image sensor according to some embodiments of the present disclosure.
Figure 5:
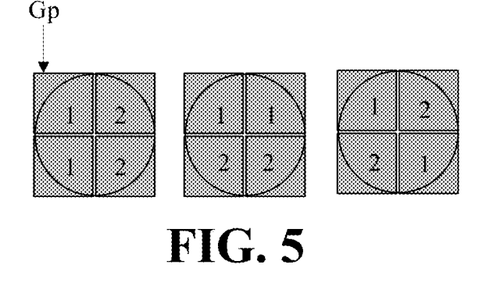
FIG. 5 is a schematic view illustrating a division of the focusing photosensitive cell having 2*2 photosensitive pixels according to some embodiments of the present disclosure.
Figure 6:
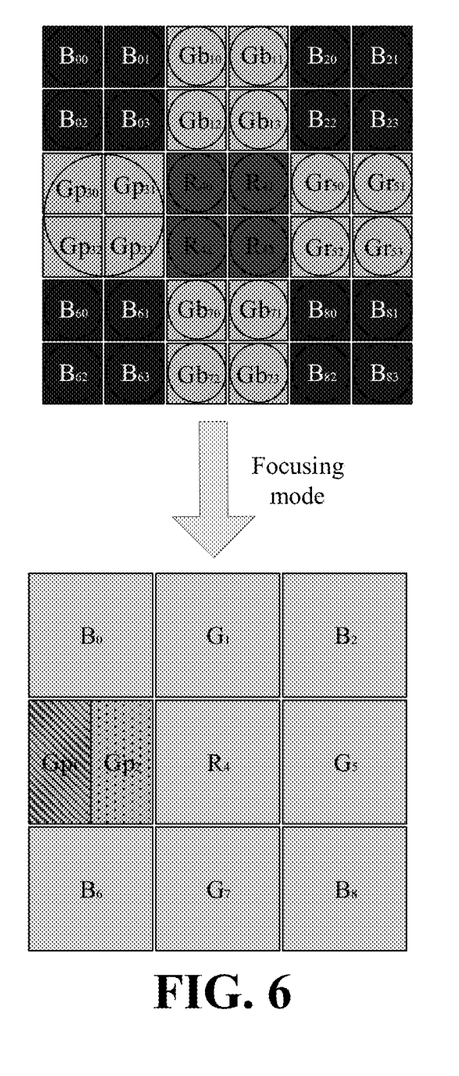
FIG. 6 is a schematic view illustrating a focusing effect of the image sensor according to some embodiments of the present disclosure.
Figure 7:
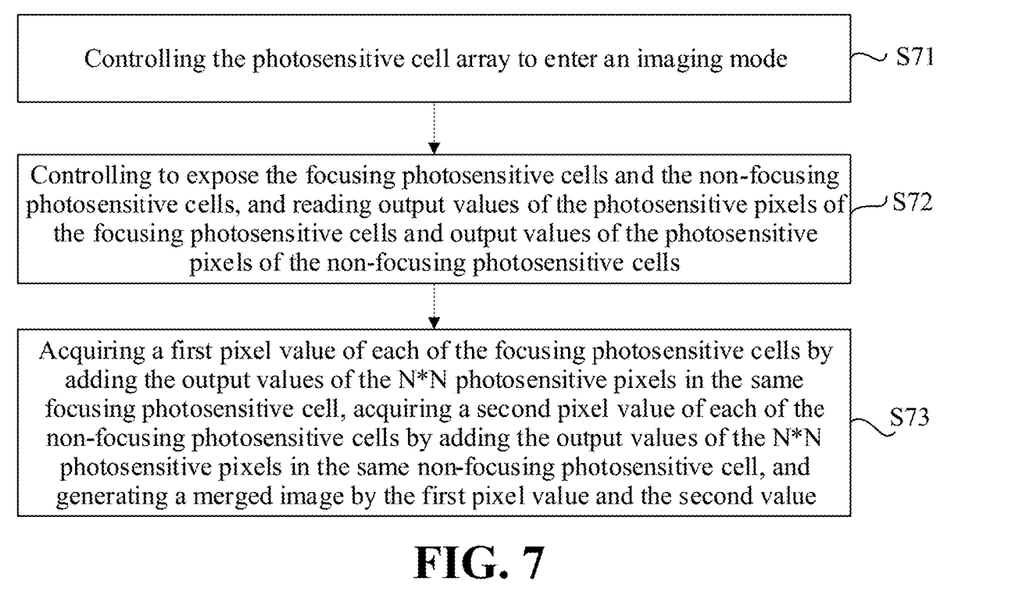
FIG. 7 is a flowchart of an imaging method for the image sensor according to some embodiments of the present disclosure.
Figure 8:
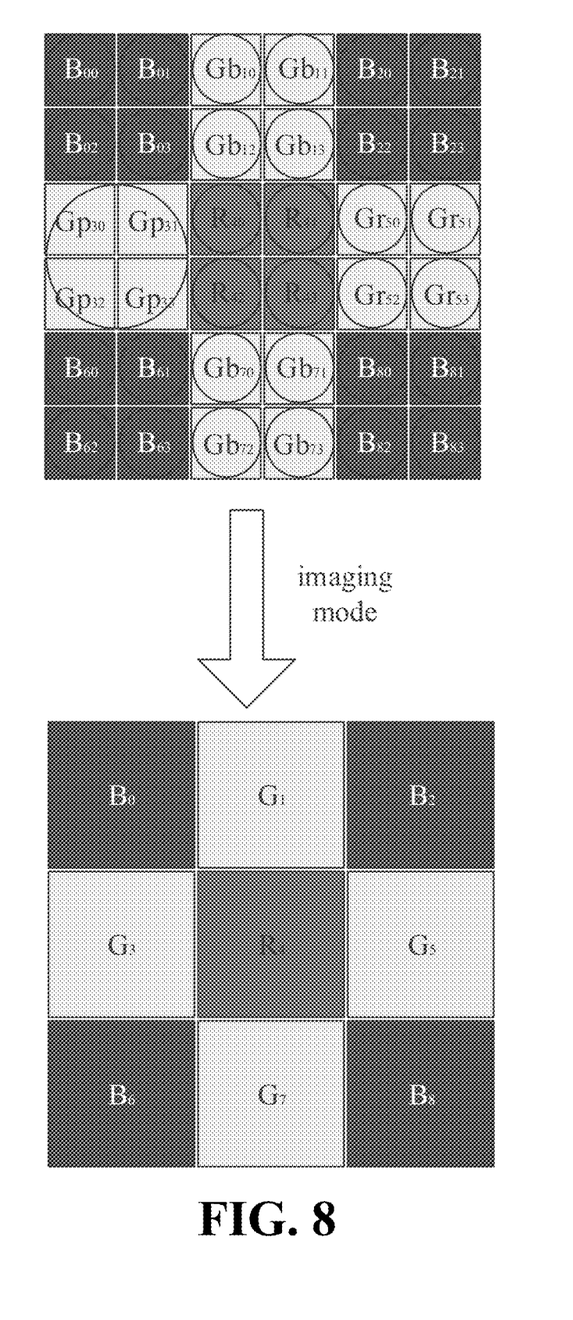
FIG. 8 is a schematic view of an imaging effect according to some embodiments of the present disclosure.

In some embodiments, the image sensor 100 may further include a controller. The controller may be coupled to the photosensitive cell array 10 and configured to perform a focusing control method for the image sensor 100 as shown in FIGS. 4-6 and the imaging method as shown in FIGS. 7-8.

Based on the structure of the image sensor 100 shown in FIGS. 1-3, the focusing control method for the image sensor 100 according to some embodiments the present disclosure will be described below. FIG. 4 is a flowchart illustrating a focusing control method for the image sensor according to some embodiments of the present disclosure. As shown in FIG. 4, the method may include operations executed by the following blocks.

At S41, the photosensitive cell array 10 may be controlled to enter a focusing mode.

For example, when taking a picture of an object by using a mobile phone, the object to be photographed may be aligned with a shooting device (for example, a camera) of the mobile phone, and focus may be performed by tapping a screen. At this time, the photosensitive cell array may enter the focusing mode.

At S42, output values of a part of the photosensitive pixels 110 in each focusing photosensitive cell 11 may be read as first output values.

After the photosensitive cell array enters the focusing mode, the output values of a part of the photosensitive pixels 110 in each focusing photosensitive cell 11 may be read as the first output values. Hereafter, the focusing photosensitive cell 11 including 2*2 photosensitive pixels 110 may be taken as an example.

In some embodiments of the present disclosure, the 2*2 photosensitive pixels 110 in the focusing photosensitive cell 11 may be divided into two parts including a left part and a right part. Thus, a part of the photosensitive pixels 110 in the focusing photosensitive cell 11 may be two photosensitive pixels 110 of the 2*2 photosensitive pixels on the left of the focusing photosensitive cell 11. That is, the output values of the two photosensitive pixels 110 on the left of the focusing photosensitive cell 11 may be used as the first output values.

In another embodiment, the 2*2 photosensitive pixels 110 in the focusing photosensitive cell 11 may be divided into two parts: an upper part and a lower part. A part of the photosensitive pixels 110 in the focusing photosensitive cell 11 may be two photosensitive pixels 110 of the 2*2 photosensitive pixels 110 on the upper of the focusing photosensitive cell 11. That is, the output values of the two photosensitive pixels 110 on the upper of the focusing photosensitive cell 11 may be used as the first output values.

In yet another embodiment, the 2*2 photosensitive pixels 110 may be divided into two parts according to two diagonal lines of the focusing photosensitive cell 11. That is, a photosensitive pixel 110 at the upper-left corner and a photosensitive pixel 110 at the lower-right corner may be used as one part of the photosensitive pixels 110. A photosensitive pixel 110 at the lower-left corner and a photosensitive pixel 110 at the upper-right corner may be used as the other part of the photosensitive pixels.

The division of the 2*2 photosensitive pixels 110 of the focusing photosensitive cell 11 may be described above. As shown in FIG. 5, the output values of the photosensitive pixels 110 at "1" in the focusing photosensitive cell Gp may be read as the first output values.

At S43, output values of the remaining part of the photosensitive pixels 110 in each focusing photosensitive cell 11 may be read as second output values.

As shown in FIG. 5, when the output values of the photosensitive pixels 110 at "1" in FIG. 5 are read as the first output values, the output values of the remaining part of the photosensitive pixels 110 in each focusing photosensitive cell 11 may be read as the second output values. That is, the output values of the photosensitive pixels 110 at "2" may be read as the second output values.

Herein, the focusing photosensitive cell 11 having 2*2 photosensitive pixels 110 may be taken as an example, wherein the output values of the photosensitive pixels 110 on the left may be read as the first output values, and the output value of the photosensitive pixels 110 on the right may be read as the second output values. As shown in FIG. 6, when the output values Gp30 and Gp32 of two photosensitive pixels 110 at the left of the focusing photosensitive cell Gp are used as the first output values, the output values Gp31 and Gp33 of the other part of the photosensitive pixels, that is, two photosensitive pixels 110 at the right of the focusing photosensitive cell 110 may be used as the second output values.

At S44, focusing control may be performed according to the first output values and the second output values.

In the related art, generally, in order to achieve Phase Detection Auto Focus (PDAF), a photosensitive pixel structure design (also called as masked pixels; the masked pixel structure may have a structure more complicated than an ordinary photosensitive pixel structure. It may be usually necessary to change the structure of the ordinary photosensitive pixel itself or add a light shielding portion separately to the photosensitive pixel structure, such that light in a specific direction among the light directed to the masked pixels from multiple directions may not reach photosensitive portions of the masked pixels, and other light except the light in the specific direction may reach the photosensitive portions of the masked pixels. In other words, the masked pixels may be usually arranged in pairs, adjacent to each other and symmetrically, and the masked pixels arranged in pairs may be configured to separate the light in multiple directions) in which the photosensitive pixels may be adjacent to each other and arranged in pairs in an image sensor may be generally used. Imaging beams in multiple directions and directed to the masked pixels arranged in pairs may be separated into two parts, for example, the left part and the right part. A distance by which a lens of a device (such as a mobile phone, an electronic device, and the like) needs to move may be calculated by comparing a phase difference (that is, by collecting the output of the masked pixels arranged in pairs) between the light at the left and right parts after performing the imaging.

In some embodiments of the present disclosure, one first micro-lens 31 may be configured to cover one focusing photosensitive cell 11, and each focusing photosensitive cell 11 may include N*N photosensitive pixels 110, that is, one first micro-lens 31 may correspond to N*N photosensitive pixels 110. In this way, the phase difference information of the imaged image may be acquired by comparing light signals in different directions, and distance information of the captured object may be further acquired according to the phase difference information, thereby providing a data basis for tests of phase focusing and information about depth of field. Apparently, in some embodiments of the present disclosure, phase focusing detection may be realized only by using a cooperation design of the micro-lens cell, the filtering cell, and the focusing photosensitive cell, without changing the structure of the ordinary photosensitive pixel itself or separately adding the light shielding portion to the photosensitive pixel structure. In this way, the implementation of the phase focusing detection may be also simpler.

As shown in FIG. 6, after acquiring the first output values and the second output values, a sum of the output values Gp30 and Gp32 of the two photosensitive pixels 110 on the left may be calculated; that is, Gp1=Gp30+Gp32, and a first phase value Gp1 may be generated. That is to say, the first phase value may be a sum of the first output values. Likewise, a sum of the output values Gp31 and Gp33 of the two photosensitive pixels 110 on the right may be also calculated, that is, Gp2=Gp31+Gp33, and a second phase value Gp2 may be generated. That is to say, the second phase value may be a sum of the second output values. Therefore, the phase difference information between the first phase value Gp1 and the second phase value Gp2 may be acquired, and the phase difference information may be converted into focus distance information. The phase focusing may be achieved by adjusting a position of the lens in an electronic device (such as a mobile terminal and the like) according to the focus distance information, and the implementation of the phase focusing detection may be also simpler.

In some embodiments of the present disclosure, when the output values of the photosensitive pixels 110 on the left and right of the 2*2 photosensitive pixels 110 in the focusing photosensitive cell 11 are used as the first output values and the second output values, the phase difference information in the left and right directions may be detected. When the output values of the photosensitive pixels 110 on the upper and lower of the 2*2 photosensitive pixels 110 are respectively used as the first output values and the second output values, the phase difference information in the up and down directions may be detected. When the output values of the photosensitive pixels 110 on the two diagonal lines of the focusing photosensitive cell 110 are used as the first output values and the second output values, respectively, the phase difference information in an oblique direction (that is, a diagonal direction) may be detected.

In the focusing control method according to some embodiments of the present disclosure, the phase information of incident light from different directions may be acquired by reading the output values of the photosensitive pixels in different parts of the focusing photosensitive cell, and the phase information in different directions may be detected, thereby improving the focusing speed under the dark light, and the focusing may be more accurate.

According to the focusing control method for the image sensor according to some embodiments of the present disclosure, in the image sensor 100, one first micro-lens 31 may cover one focusing photosensitive cell 11, and N*N second micro-lenses 32 may cover one non-focusing photosensitive cell 12. Based on the structure of the image sensor 100, by using the output values of a part of the photosensitive pixels 110 and the output values of the other part (the remaining part) of the photosensitive pixels 110 in the focusing photosensitive cell 11, it is possible to perform the focusing control, and increase the focusing speed.

Furthermore, based on the structure of the image sensor 100 shown in FIGS. 1-3, the imaging method for an image sensor may be further provided in some embodiments of the present disclosure.

As shown in FIG. 7, the imaging method for the image sensor may include operations executed by the following blocks.

At S71, the photosensitive cell array may be controlled to enter an imaging mode.

For example, in case that a picture of an object is taken by using a camera of a mobile phone, when the camera is aligned with the object, the photosensitive cell array may enter an imaging mode.

At S72, the focusing photosensitive cell and the non-focusing photosensitive cell may be controlled to be exposed, and output values of the photosensitive pixels of the focusing photosensitive cells and the photosensitive pixels of the non-focusing photosensitive cells may be read.

For example, each of the focusing photosensitive cell and the non-focusing photosensitive cell may include 2*2 photosensitive pixels. As shown in FIG. 8, blue pixel B0, green pixel G1, green pixel G3, and red pixel R4 may form a Bayer RGB array. The focusing photosensitive cell and the non-focusing photosensitive cell may be exposed, and the output values Gp30, Gp31, Gp32, and Gp33 of the photosensitive pixels of the focusing photosensitive cell and the output values B00, B01, B02, B03, Gb10, Gb11, Gb12, Gb13, and the like of the photosensitive pixels of the non-focusing photosensitive cell may be read.

At S73, the output values of the N*N photosensitive pixels in the same focusing photosensitive cell may be added together or the output values of the N*N photosensitive pixels in the same non-focusing photosensitive cell may be added together, in order to acquire a pixel value of each focusing photosensitive cell and a pixel value of each non-focusing photosensitive cell to generate a merged image. That is to say, a first pixel value of each of the focusing photosensitive cells may be acquired by adding the output values of the N*N photosensitive pixels in the same focusing photosensitive cell. A second pixel value of each of the non-focusing photosensitive cells may be acquired by adding the output values of the N*N photosensitive pixels in the same non-focusing photosensitive cell. The merged image may be acquired or generated by the first pixel value and the second pixel value.

As shown in FIG. 8, the output values Gp30, Gp31, Gp32, and Gp33 of the 2*2 photosensitive pixels in the same focusing photosensitive cell may be added, that is, Gp30+Gp31+Gp32+Gp33=G3, and the pixel value G3 of the focusing photosensitive cell may be acquired. The output values B00, B01, B02, and B03 of the 2*2 photosensitive pixels in the same non-focusing photosensitive cell may be added, that is, B00+B01+B02+B03=B0, and the pixel value B0 of the non-focusing photosensitive cell may be acquired. Likewise, the pixel values of the non-focusing photosensitive cells may also be acquired, for example, the pixel value of the green pixel may be acquired by G1=Gb10+Gb11+Gb12+Gb13, the pixel value of the red pixel may be acquired by R4=R40+R41+R42+R43, and the like. The merged image may be generated according to the pixel values of the focusing photosensitive cells and the non-focusing photosensitive cells.

In the imaging method for the image sensor according to some embodiments of the present disclosure, the sum of the output values of the N*N photosensitive pixels in each photosensitive cell may be used as the pixel value of the corresponding photosensitive cell, and the merged image may be generated according to the pixel values of the focusing photosensitive cells and the non-focusing photosensitive cells. In this way, it is possible to effectively improve an imaging sensitivity and a signal-to-noise ratio of the image.

In another aspect, an imaging device according to some embodiments of the present disclosure will be described below.

Figure 9:
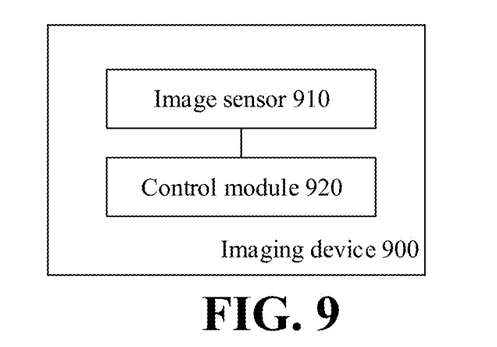
FIG. 9 is a block diagram of an imaging device according to some embodiments of the present disclosure.

FIG. 9 is a block diagram of the imaging device according to some embodiments of the present disclosure. As shown in FIG. 9, the imaging device 900 may include an image sensor 910 as described in above aspects and a control module 920.

The control module 920 may be configured to control the photosensitive cell array 10 to enter the focusing mode; read output values of a part of the photosensitive pixels 110 in each of the focusing photosensitive cells 11 as first output values; read output values of the remaining part of the photosensitive pixels 110 in each of the focusing photosensitive cells 11 as second output values; and perform focusing control according to the first output values and the second output values.

The control module 920 may be specifically configured to: generate a first phase value according to the first output values; generate a second phase value according to the second output values; and perform the focusing control according to the first phase value and the second phase value.

The control module 920 may be further configured to: control the photosensitive cell array to enter the imaging mode; control to expose the focusing photosensitive cells and the non-focusing photosensitive cells, and read output values of the photosensitive pixels of the focusing photosensitive cells and output values of the photosensitive pixels of the non-focusing photosensitive cells; and acquire a first pixel value of each of the focusing photosensitive cells by adding the output values of the N*N photosensitive pixels in the same focusing photosensitive cell, and acquire a second pixel value of each of the non-focusing photosensitive cells by adding the output values of the N*N photosensitive pixels in the same non-focusing photosensitive cell, and generate a merged image by the first pixel value and the second pixel value.

According to the imaging device of the present disclosure, in the image sensor, one first micro-lens may cover one focusing photosensitive cell, and N*N second micro-lenses may cover one non-focusing photosensitive cell. Based on the structure of the image sensor, by using the output values of a part of the photosensitive pixels and the output values of the other part of the photosensitive pixels in the focusing photosensitive cells, it is possible to perform the focusing control, and increase the focusing speed.

In a further aspect, an electronic device may be further provided according to some embodiments of the present disclosure.

Figure 10:
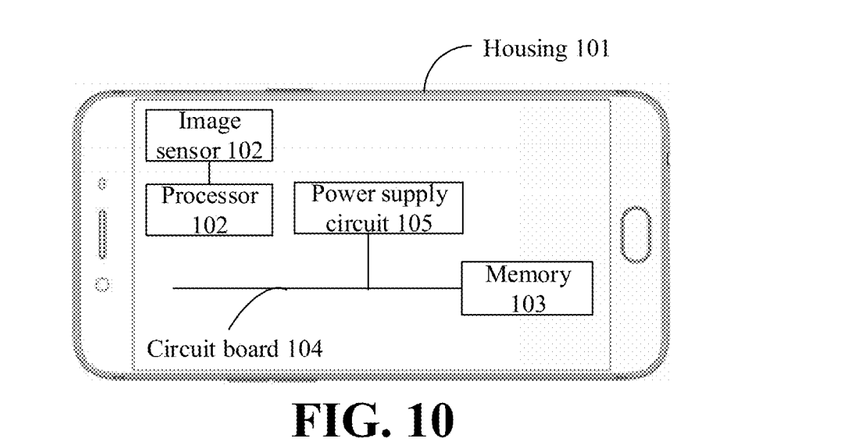
FIG. 10 is a schematic structural view of an electronic device according to some embodiments of the present disclosure.

As shown in FIG. 10, the electronic device may include a housing 101, a processor 102, a non-transitory memory 103, a circuit board 104, a power supply circuit 105, and an image sensor 106. The processor 102, the non-transitory memory 103, the circuit board 104, the power supply circuit 105, and the image sensor 106 may be received in the housing 101. In some embodiments, the circuit board 104 may be disposed inside a space enclosed by the housing 101. The processor 102 and the non-transitory memory 103 may be disposed on the circuit board 104. The power supply circuit 105 may be configured to supply power to various circuits or components of the electronic device. The non-transitory memory 103 may be configured to store executable program code. The processor 102 may be configured to read the executable program code stored in the non-transitory memory 103 and run a program corresponding to the executable program code, in order to perform the focusing control method for the image sensor in the above aspect. Herein, the image sensor 106 may be connected to the processor 102, and may be the image sensor described in any embodiment aforementioned.

According to the electronic device according to some embodiments of the present disclosure, in the image sensor, one first micro-lens may cover one focusing photosensitive cell, and N*N second micro-lenses may cover one non-focusing photosensitive cell. Based on the structure of the image sensor, by using the output values of a part of the photosensitive pixels and the output value of the other part of the photosensitive pixels in the focusing photosensitive cells, it is possible to perform the focusing control, and increase the focusing speed.

In some embodiments of the present disclosure, a computer program product may also be provided. When instructions in the computer program product are executed by a processor, the focusing control method for the image sensor as described in the above embodiments may be performed.

In some embodiments of the present disclosure, a computer-readable storage medium (such as a non-transitory storage medium) may be further provided. The storage medium may store a computer program which, when executed by the processor, performs the focusing control method for the image sensor as described in the above embodiments.

It should be noted that, in the present disclosure, the use of relational terms, such as first and second, and the like are used solely to distinguish one entity or action from another entity or action without necessarily requiring or implying any actual such relationship or order between such entities or actions. Moreover, the terms "comprise", "include" or any other variations thereof are meant to cover non-exclusive including, so that the process, method, article or device comprising a series of elements do not only include those elements, but also includes other elements that are not explicitly listed or also include the inherent elements of the process, method, article or device. In the case that there are no more restrictions, an element qualified by the statement "comprise a . . . " does not exclude the presence of additional identical elements in the process, method, article or device that includes the element.

The logic and/or steps described in other manners herein or shown in the flow chart, for example, a particular order list of executable instructions for realizing the logical function, may be specifically achieved in any computer-readable medium to be used by an instruction execution system, a device or an equipment (such as a system based on computers, a system including processors or other systems capable of acquiring an instruction from the instruction execution system, device and equipment and executing the instruction), or to be used in combination with the instruction execution system, device and equipment. As to the specification, "the computer-readable medium" may be any device adaptive for including, storing, communicating, propagating or transferring programs to be used by or in combination with the instruction execution system, device or equipment. More specific examples of the computer-readable medium may include but be not limited to: an electronic connection (an electronic device) with one or more wires, a portable computer enclosure (a magnetic device), a random-access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that, each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), and the like.

It should be noted that, in the description of the present specification, the description with reference to the terms "one embodiment", "some embodiments", "example", "specific example", or "some examples", and the like, means that a specific feature, structure, material, or characteristic described in connection with the embodiment or example is included in at least one embodiment or example of the present disclosure. Thus, the illustrative descriptions of the terms throughout this specification are not necessarily referring to the same embodiment or example of the present disclosure. Furthermore, the specific features, structures, materials, or characteristics may be combined in any suitable manner in one or more embodiments or examples. In addition, various embodiments or examples described in the specification and features of various embodiments or examples, may be incorporated and combined by those skilled in the art in case of an absence of confliction.

In the description of the present specification, the description with reference to the terms "one embodiment", "some embodiments", "example", "specific example", or "some examples", and the like, means that a specific feature, structure, material, or characteristic described in connection with the embodiment or example is included in at least one embodiment or example of the present disclosure. Thus, the illustrative descriptions of the terms throughout this specification are not necessarily referring to the same embodiment or example of the present disclosure. Furthermore, the specific features, structures, materials, or characteristics may be combined in any suitable manner in one or more embodiments or examples. In addition, various embodiments or examples described in the specification and features of various embodiments or examples, may be incorporated and combined by those skilled in the art in case of an absence of confliction.

Although explanatory embodiments of the present disclosure have been shown and described, it would be appreciated by those skilled in the art that the above embodiments are illustrative, and cannot be construed to limit the present disclosure. Changes, modifications, alternatives, and transformation can be made to the embodiments by those skilled in the art without departing from scope of the present disclosure.

What is claimed is:

1. A method of focusing control for an image sensor, the image sensor comprising:
    a photosensitive cell array, comprising one or more focusing photosensitive cells and a plurality of non-focusing photosensitive cells; each of the focusing photosensitive cells comprising a plurality of photosensitive pixels;
    a filtering cell array, disposed above the photosensitive cell array; and
    a micro-lens array, located above the filtering cell array, and comprising one or more first micro-lenses and a plurality of second micro-lenses; wherein each of the focusing photosensitive cells is covered by a corresponding one of the first micro-lenses, and each of the non-focusing photosensitive cells is covered by N*N of the second micro-lenses; wherein N is a positive integer; and
    the method comprising:
    controlling the photosensitive cell array to enter a focusing mode;
    reading output values of a part of the photosensitive pixels in each of the focusing photosensitive cells as first output values;
    reading output values of the remaining part of the photosensitive pixels in each of the focusing photosensitive cells as second output values; and
    performing focusing control according to the first output values and the second output values, comprising:
        generating, according to the first output values, a first phase value; wherein the first phase value is a sum of the first output values;
        generating, according to the second output values, a second phase value; wherein the second phase value is a sum of the second output values; and
        performing the focusing control according to the first phase value and the second phase value.

2. The method of claim 1, wherein the image sensor is used in an electronic device, and the electronic device comprises a lens; and
    performing the focusing control according to the first phase value and the second phase value comprises:
        acquiring phase difference information by using the first phase value and the second phase value;
        converting the phase difference information into focus distance information; and
        adjusting, according to the focus distance information, a position of the lens.

3. The method of claim 1, wherein the micro-lens array has a horizontal centerline and a vertical centerline; a number of the first micro-lenses is two or more, and the two or more first micro-lenses comprise:
    a first group of first micro-lenses, disposed along the horizontal centerline; and
    a second group of first micro-lenses, disposed along the vertical centerline.

4. The method of claim 3, wherein the micro-lens array has four edges, and the two or more first micro-lenses further comprise:
    a third group of first micro-lenses, disposed on the four edges.

5. The method of claim 4, wherein the first group of first micro-lenses are arranged in a first density; the second group of first micro-lenses are arranged in a second density, and the third group of first micro-lenses are arranged in a third density; and the first density and the second density are greater than the third density.

6. The method of claim 4, wherein the four edges are arranged to form a rectangle, each of the leftmost first micro-lenses and the rightmost first micro-lenses one of the first group of first micro-lenses along the horizontal centerline is located on one of the four edges, and each of the top first micro-lenses and the bottom first micro-lenses of the second group of first micro-lenses along the vertical centerline is located on one of the four edges;
    the third group of first micro-lenses comprises four first micro-lenses disposed on four corners of the rectangle, and each of the leftmost first micro-lenses, the rightmost first micro-lenses, the top first micro-lenses, and the bottom first micro-lenses is disposed on a straight line defined by adjacent two of the four first micro-lenses.

7. The method of claim 1, wherein each of the focusing photosensitive cells and the non-focusing photosensitive cells comprise N*N photosensitive pixels, and the method further comprises:
    controlling the photosensitive cell array to enter an imaging mode;
    controlling to expose the focusing photosensitive cells and the non-focusing photosensitive cells, and reading output values of the photosensitive pixels of the focusing photosensitive cells and output values of the photosensitive pixels of the non-focusing photosensitive cells; and
    acquiring a first pixel value of each of the focusing photosensitive cells by adding the output values of the N*N photosensitive pixels in the same focusing photosensitive cell, acquiring a second pixel value of each of the non-focusing photosensitive cells by adding the output values of the N*N photosensitive pixels in the same non-focusing photosensitive cell, and generating a merged image by the first pixel value and the second pixel value.

8. An image sensor, comprising:
    a photosensitive cell array, comprising one or more focusing photosensitive cells and a plurality of non-focusing photosensitive cells; each of the focusing photosensitive cells comprising a plurality of photosensitive pixels;
    a filtering cell array, disposed above the photosensitive cell array;
    a micro-lens array, located above the filtering cell array, and comprising one or more first micro-lenses and a plurality of second micro-lenses; wherein each of the focusing photosensitive cells is covered by a corresponding one of the first micro-lenses, and each of the non-focusing photosensitive cells is covered by N*N of the second micro-lenses; wherein N is a positive integer; and a controller, coupled to the photosensitive cell array and
configured to:
control the photosensitive cell array to enter a focusing
mode;
read output values of a part of the photosensitive pixels
in each of the focusing photosensitive cells as first
output values;
read output values of the remaining part of the photosensitive pixels in each of the focusing photosensitive cells as second output values; and
perform focusing control according to the first output
values and the second output values;
wherein the micro-lens array has a horizontal centerline,
a vertical centerline, and four edges, the number of the
first micro-lenses is two or more, and the two or more
first micro-lenses comprises:
a first group of first micro-lenses, disposed along the
horizontal centerline;
a second group of first micro-lenses, disposed along the
vertical centerline; and
a third group of first micro-lenses, disposed on the four
edges;
wherein the first group of first micro-lenses are
arranged in a first density, the second group of first
micro-lenses are arranged in a second density, the
third group of first micro-lenses are arranged in a
third density, and the first density and the second
density are greater than the third density.

9. The image sensor of claim 8, wherein each of the focusing photosensitive cells and the non-focusing photosensitive cells comprises N*N photosensitive pixels.

10. The image sensor of claim 8, wherein the image sensor is used in an electronic device, and the electronic device comprises a lens; and
the controller is configured to perform focusing control according to the first output values and the second output values by:
generating, according to the first output values, a first phase value; wherein the first phase value is a sum of the first output values;
generating, according to the second output values, a second phase value; wherein the second phase value is a sum of the second output values;
acquiring phase difference information by using the first phase value and the second phase value;
converting the phase difference information into focus distance information; and
adjusting, according to the focus distance information, a position of the lens.

11. The image sensor of claim 8, wherein the controller is further configured to:
control the photosensitive cell array to enter an imaging mode;
control to expose the focusing photosensitive cells and the non-focusing photosensitive cells, and read output values of the photosensitive pixels of the focusing photosensitive cells and output values of the photosensitive pixels of the non-focusing photosensitive cells; and
acquire a first pixel value of each of the focusing photosensitive cells by adding the output values of the N*N photosensitive pixels in the same focusing photosensitive cell, acquire a second pixel value of each of the non-focusing photosensitive cells by adding the output values of the N*N photosensitive pixels in the same non-focusing photosensitive cell, and generating a merged image by the first pixel value and the second pixel value.

12. The image sensor of claim 8, wherein the filtering cell array comprises a plurality of filtering cells; and each of the filtering cells is disposed correspondingly to one of the focusing photosensitive cells or one of the non-focusing photosensitive cells.

13. The image sensor of claim 8, wherein the four edges are arranged to form a rectangle, each of the leftmost first micro-lenses and the rightmost first micro-lenses one of the first group of first micro-lenses along the horizontal centerline is located on one of the four edges, and each of the top first micro-lenses and the bottom first micro-lenses of the second group of first micro-lenses along the vertical centerline is located on one of the four edges;
the third group of first micro-lenses comprises four first micro-lenses disposed on four corners of the rectangle, and each of the leftmost first micro-lenses, the rightmost first micro-lenses, the top first micro-lenses, and the bottom first micro-lenses is disposed on a straight line defined by adjacent two of the four first micro-lenses.

14. An electronic device, comprising:
a housing;
an image sensor, received in the housing and comprising:
a photosensitive cell array, comprising one or more focusing photosensitive cells and a plurality of non-focusing photosensitive cells; each of the focusing photosensitive cells and the non-focusing photosensitive cells comprising N*N photosensitive pixels;
wherein N is a positive integer;
a filtering cell array, disposed above the photosensitive cell array; and
a micro-lens array, located above the filtering cell array, and comprising one or more first micro-lenses and a plurality of second micro-lenses; wherein each of the first micro-lenses is disposed correspondingly to and covering N*N photosensitive pixels in the corresponding focusing photosensitive cell; each of the second micro-lenses is disposed correspondingly to and covering one photosensitive pixel in the corresponding non-focusing photosensitive cell;
a non-transitory memory, received in the housing and configured to store a executable program code; and
a processor, received in the housing, configured to read the executable program code stored in the non-transitory memory, and run a program corresponding to the executable program code to:
control the photosensitive cell array to enter a focusing mode;
read output values of a part of the plurality of photosensitive pixels in each of the focusing photosensitive cells as first output values;
read output values of the remaining part of the plurality of photosensitive pixels in each of the focusing photosensitive cells as second output values;
perform focusing control according to the first output values and the second output values;
control the photosensitive cell array to enter an imaging mode;
control to expose the focusing photosensitive cells and the non-focusing photosensitive cells, and read output values of the photosensitive pixels of the focusing photosensitive cells and output values of the photosensitive pixels of the non-focusing photosensitive cells; and
acquire a first pixel value of each of the focusing photosensitive cells by adding the output values of the N*N photosensitive pixels in the same focusing photosensitive cell, acquire a second pixel value of each of the non-focusing photosensitive cells by adding the output values of the N*N photosensitive pixels in the same non-focusing photosensitive cell, and generate a merged image by the first pixel value and the second pixel value.

15. The electronic device of claim 14, further comprising a lens; wherein the processor is configured to perform focusing control according to the first output values and the second output values by:
  generating, according to the first output values, a first phase value; wherein the first phase value is a sum of the first output values;
  generating, according to the second output values, a second phase value; wherein the second phase value is a sum of the second output values;
  acquiring phase difference information by using the first phase value and the second phase value;
  converting the phase difference information into focus distance information; and
  adjusting, according to the focus distance information, a position of the lens.

16. The electronic device of claim 14, wherein the micro-lens array has a horizontal centerline, a vertical centerline, and four edges; the number of the first micro-lenses is two or more, and the two or more first micro-lenses comprises:
  a first group of first micro-lenses, disposed along the horizontal centerline;
  a second group of first micro-lenses, disposed along the vertical centerline; and
  a third group of first micro-lenses, disposed on the four edges;
  the first group of first micro-lenses are arranged in a first density; the second group of first micro-lenses are arranged in a second density, and the third group of first micro-lenses are arranged in a third density; and the first density and the second density are greater than the third density.

17. The electronic device of claim 16, wherein the four edges are arranged to form a rectangle, each of the leftmost first micro-lenses and the rightmost first micro-lenses one of the first group of first micro-lenses along the horizontal centerline is located on one of the four edges, and each of the top first micro-lenses and the bottom first micro-lenses of the second group of first micro-lenses along the vertical centerline is located on one of the four edges;
  the third group of first micro-lenses comprises four first micro-lenses disposed on four corners of the rectangle, and each of the leftmost first micro-lenses, the rightmost first micro-lenses, the top first micro-lenses, and the bottom first micro-lenses is disposed on a straight line defined by adjacent two of the four first micro-lenses.

18. The electronic device of claim 14, wherein the filtering cell array comprises a plurality of filtering cells; and each of the filtering cells is disposed correspondingly to one of the focusing photosensitive cells or one of the non-focusing photosensitive cells.

* * * * *